United States Patent
Sato (10) Patent No.: US 11,958,671 B2
(45) Date of Patent: Apr. 16, 2024

(54) LAMINATED STRUCTURE, FOOD PACKAGING CONTAINER, AND METHOD FOR PRODUCING THE SAME

(71) Applicant: TBM CO., LTD., Tokyo (JP)

(72) Inventor: Erina Sato, Tokyo (JP)

(73) Assignee: TBM CO., LTD., Tokyo (JP)

( * ) Notice: Subject to any disclaimer, the term of this patent is extended or adjusted under 35 U.S.C. 154(b) by 319 days.

(21) Appl. No.: 17/626,577

(22) PCT Filed: May 11, 2020

(86) PCT No.: PCT/JP2020/018871
§ 371 (c)(1),
(2) Date: Jan. 12, 2022

(87) PCT Pub. No.: WO2021/010002
PCT Pub. Date: Jan. 21, 2021

(65) Prior Publication Data
US 2022/0258938 A1    Aug. 18, 2022

(30) Foreign Application Priority Data
Jul. 17, 2019   (JP) ................................. 2019-132173

(51) Int. Cl.
*B65D 65/42*    (2006.01)
*C08J 7/04*    (2020.01)
(Continued)

(52) U.S. Cl.
CPC .............. *B65D 65/42* (2013.01); *C08J 7/042* (2013.01); *C08J 7/043* (2020.01); *C09D 7/61* (2018.01);
(Continued)

(58) Field of Classification Search
None
See application file for complete search history.

(56) References Cited

U.S. PATENT DOCUMENTS 5,017,430 A * 5/1991 Chu ........................ B32B 27/32
428/518
2001/0003626 A1    6/2001 Syoda et al.
(Continued)

FOREIGN PATENT DOCUMENTS

EP    0443233 A1    8/1991
EP    3260292 A1    12/2017
(Continued)

OTHER PUBLICATIONS

Valadez-Gonzalez—mineral filler on photooxidative stability—PE+ calcium carbonate—1999 (Year: 1999).*
(Continued)

*Primary Examiner* — John Vincent Lawler
(74) *Attorney, Agent, or Firm* — CANTOR COLBURN LLP (57) ABSTRACT

Provided are a laminated structure having a composition coping with environmental problems and having an excellent gas barrier property and oil resistance, a food packaging container formed by using the laminated structure, and a method for producing the laminated structure. The laminated structure includes a second coating layer including a polyvinylidene chloride-based resin through a first coating layer formed by blending clay in a proportion of 35% by mass or more and 65% by mass or less and light calcium carbonate in a proportion of 5% by mass or more and 30% by mass or less in a continuous phase made of an acrylic polymer on one surface or both surfaces of a substrate including a thermoplastic resin and an inorganic substance powder in a mass ratio of 50:50 to 10:90.

20 Claims, 1 Drawing Sheet (51) Int. Cl.
   *C08J 7/043* (2020.01)
   *C09D 7/40* (2018.01)
   *C09D 7/61* (2018.01)
   *C09D 127/08* (2006.01)
   *C09D 133/10* (2006.01)

(52) U.S. Cl.
   CPC ............. *C09D 7/69* (2018.01); *C09D 127/08* (2013.01); *C09D 133/10* (2013.01); *C08J 2327/08* (2013.01); *C08J 2333/10* (2013.01)

(56) References Cited

U.S. PATENT DOCUMENTS

| | | | |
|---|---|---|---|
| 2015/0353695 | A1 | 12/2015 | Sumi |
| 2019/0077571 | A1* | 3/2019 | Monforton ............. B32B 27/32 |
| 2019/0322428 | A1* | 10/2019 | Lindstedt ............... B32B 27/34 |
| 2020/0024417 | A1 | 1/2020 | Sumi et al. |
| 2020/0224016 | A1 | 7/2020 | Kuroki et al. |

FOREIGN PATENT DOCUMENTS

| | | | |
|---|---|---|---|
| JP | S63307055 A | 12/1988 | |
| JP | H01284371 A | 11/1989 | |
| JP | H04072135 A | 3/1992 | |
| JP | H08276566 A | 10/1996 | |
| JP | 2001225422 A | 8/2001 | |
| JP | 2002105411 A | 4/2002 | |
| JP | 2002113028 A | 4/2002 | |
| JP | 2004261668 A | 9/2004 | |
| JP | 2018508607 A | 3/2018 | |
| WO | 2014109267 A1 | 7/2014 | |
| WO | 2016110711 A1 | 7/2016 | |
| WO | 2018047754 A1 | 3/2018 | |
| WO | 2018096834 A1 | 5/2018 | |
| WO | 2019059222 A1 | 3/2019 | |

OTHER PUBLICATIONS

4—Additives-for-Plastics_2018_Introduction-to-Plastics-Engineering (Year: 2018).*

International Search Report for International Application No. PCT/JP2020/018871; dated Jul. 14, 2020.

Database WPI, Week 199701, Oct. 22, 1996, Thomson Scientific, 2 pages.

EPO Extended European Search Report corresponding to EP Application No. 20841252.8, dated Jul. 17, 2023.

* cited by examiner

LAMINATED STRUCTURE, FOOD PACKAGING CONTAINER, AND METHOD FOR PRODUCING THE SAME

CROSS REFERENCE TO RELATED APPLICATIONS

This is the U.S. national stage of application No. PCT/JP2020/018871, filed on May 11, 2020. Priority under 35 U.S.C. § 119(a) and 35 U.S.C. § 365(b) is claimed from Japanese Application No. 2019-132173, filed Jul. 17, 2019, the disclosure of which is also incorporated herein by reference.

FIELD

The present invention relates to a laminated structure, a food packaging container, and a method for producing the same. More specifically described, the present invention relates to a laminated structure having a composition coping with environmental problems and having an excellent gas barrier property and oil resistance, a food packaging container formed by using the same, and a method for producing the same.

BACKGROUND

Conventionally, as food packaging containers, containers formed by using paper, polyester, polypropylene, foamed polystyrene, or the like as the substrates of the food packaging containers have been widely used. However, environmental protection becomes an international issue now and thus reduction in the consumption amount of the thermoplastic resins and paper materials has been significantly studied. From such a viewpoint, an inorganic substance powder-blended thermoplastic resin composition made by highly filling inorganic substance powder into a thermoplastic resin has been developed (refer to, for example, Patent Literature 1) and has been expected to be applied in the field of the food packaging containers.

However, with respect to the food packaging container formed of the inorganic substance powder-blended thermoplastic resin composition as described above, problems in that the inorganic substance powder may fall off during use and calcium carbonate, which is used as the inorganic substance powder, may be eluted into food, in particular liquid food such as strongly acidic beverages have arisen. In addition, the thermoplastic resin is highly filled with the inorganic substance powder, and thus the resin layer forming the packaging container has microscopic voids. Consequently, the container has a poor gas barrier property and has problems from the viewpoint of moisture, odor transfer, and freshness retention of the commercial product and, in addition, oil resistance is not sufficient.

Conventionally, in a general food packaging container made of foamed polystyrene or the like, the surface of a synthetic resin substrate has been coated with a vinylidene chloride-based resin layer, which has been known as a material having a high gas barrier property, in particular a vinylidene chloride latex (for example, Patent Literatures 2 to 4).

Therefore, it is considered that the surface of the food packaging container formed of the inorganic substance powder-blended thermoplastic resin composition is also coated with such a vinylidene chloride-based resin layer, in particular a vinylidene chloride latex.

However, even in the form of latex, the vinylidene chloride-based resin has poor adhesion to a substrate made of the thermoplastic resin such as a polyolefin resin that is highly filled with the inorganic substance powder such as calcium carbonate particles and thus a problem of delaminating the coating layer made of the vinylidene chloride-based resin from the substrate during the use of the packaging container arises.

Patent Literature 2 has proposed that a heat-sealing layer made of a styrene-based resin is provided on the back surface side of a gas barrier layer made of the vinylidene chloride latex to perform heat-sealing of the heat-sealing layer to a foamed polystyrene product. Patent literature 4 has proposed that the surface of the substrate made of the foamed polystyrene is coated with an ethylene vinyl alcohol copolymer (EVOH) solution and that, after drying the coated EVOH, the EVOH layer is coated with the vinylidene chloride latex to improve adhesiveness between the substrate and the coating layer made of the vinylidene chloride latex. However, even when the hot melt layer and the intermediate layer as described in Patent Literatures 2 and 4 are used, sufficient adhesion of the formed coating layer made of the vinylidene chloride-based resin to the substrate formed of the inorganic substance powder-blended thermoplastic resin composition has not been able to be obtained.

CITATION LIST

Patent Literature

Patent Literature 1: WO 2014/109267 Pamphlet
Patent Literature 2: Japanese Patent Application Laid-open No. H4-72135
Patent Literature 3: Japanese Patent Application Laid-open No. H1-284371
Patent Literature 4: Japanese Patent Application Laid-open No. S63-307055

SUMMARY

Technical Problem

The present invention has been made in view of the above actual situations. An object of the present invention is to provide an improved laminated structure, a food packaging container, and a method for producing the same. An object of the present invention is also to provide a laminated structure having a composition coping with environmental problems and having an excellent gas barrier property and oil resistance, a food packaging container formed by using the same, and a method for producing the same.

Solution to Problem

As a result of intensive study for solving the troubles such as poor adhesion between the substrate and the coating layer made of the vinylidene chloride-based resin due to the non-polarity of the substrate resin such as polypropylene and polyethylene, which are the problems of formed products having the substrate made of the conventional inorganic substance powder-blended thermoplastic resin composition, the inventors of the present invention have found that the adhesion between the substrate and the coating layer made of the vinylidene chloride-based resin is improved, that a gas barrier property and oil resistance are excellent, and that, for example, excellent improvement in performances from the viewpoint of moisture, odor transfer, and freshness retention of the commercial product is observed in the case of the use as the food packaging container by providing an undercoat layer made by blending respective predetermined amounts of clay and light calcium carbonate in an acrylic polymer aqueous emulsion between the substrate made of the inorganic substance powder-blended thermoplastic resin composition and the coating layer made of the vinylidene chloride-based resin. Consequently, the present invention has been attained.

Namely, the present invention solving the above-described problem includes a laminated structure comprising: a second coating layer comprising a polyvinylidene chloride-based resin through a first coating layer formed by blending clay in a proportion of 35% by mass or more and 65% by mass or less and light calcium carbonate in a proportion of 5% by mass or more and 30% by mass or less in a continuous phase made of an acrylic polymer on one surface or both surfaces of a substrate comprising a thermoplastic resin and an inorganic substance powder in a mass ratio of 50:50 to 10:90.

As one embodiment of the laminated structure according to the present invention, a laminated structure is represented in which the polyvinylidene chloride-based resin is a polyvinylidene chloride resin latex.

As one embodiment of the laminated stricture according to the present invention, a laminated structure is represented in which the thermoplastic resin is a polyolefin-based resin.

As one embodiment of the laminated structure according to the present invention, a laminated structure is represented in which the inorganic substance powder is a calcium carbonate powder.

As one embodiment of the laminated structure according to the present invention, a laminated structure is represented in which a volume average particle diameter of the clay is 1.0 μm or more and 10.0 μm or less.

As one embodiment of the laminated structure according to the present invention, a laminated structure is represented in which a volume average particle diameter of the light calcium carbonate is 0.05 μm or more and 2.00 μm or less.

As one embodiment of the laminated structure according to the present invention, a laminated structure is represented in which the acrylic polymer is of an alkyl (meth)acrylate.

As one embodiment of the laminated structure according to the present invention, a laminated structure is represented in which the alkyl (meth)acrylate is a kind or two or more kinds of alkyl (meth)acrylates selected from the group consisting of methyl acrylate, ethyl acrylate, n-propyl acrylate, isopropyl acrylate, n-butyl acrylate, isobutyl acrylate, n-octyl acrylate, 2-ethylhexyl acrylate, isooctyl acrylate, nonyl acrylate, methyl methacrylate, ethyl methacrylate, n-propyl methacrylate, isopropyl methacrylate, n-butyl methacrylate, isobutyl methacrylate, n-octyl methacrylate, 2-ethylhexyl methacrylate, isooctyl methacrylate, 2-hydroxymethyl acrylate, 2-hydroxyethyl methacrylate, 2-hydroxypropyl acrylate, and 2-hydroxypropyl methacrylate.

The present invention solving the above-described problem is attained by a container product comprising the above laminated structure.

As one embodiment of the container product according to the present invention, the container product used as a food packaging container is represented.

Furthermore, the present invention solving the above problems includes a method for producing a laminated structure, the method comprising: applying an acrylic polymer aqueous emulsion containing clay in a proportion of 35% by mass or more and 65% by mass or less and light calcium carbonate in a proportion of 5% by mass or more and 30% by mass or less in a dried mass in a continuous phase of an acrylic polymer on one surface or both surfaces of a substrate including a thermoplastic resin and an inorganic substance powder in a mass ratio of 50:50 to 10:90, and thereafter applying a polyvinylidene chloride resin latex.

As one embodiment of the printing sheet according to the present invention, a method for producing the laminated structure is represented in which the substrate comprising the thermoplastic resin and the inorganic substance powder in a mass ratio of 50:50 to 10:90 is extruded and formed in a form of a sheet, the acrylic polymer aqueous emulsion containing the clay in a proportion of 35% by mass or more and 65% by mass or less and the light calcium carbonate in a proportion of 5% by mass or more and 30% by mass or less in a dried mass in the continuous phase of the acrylic polymer is applied to one surface or both surfaces of the obtained sheet of the substrate, and thereafter the polyvinylidene chloride resin latex is applied.

Advantageous Effects of Invention

According to the present invention, the coating layer including the polyvinylidene chloride-based resin having excellent adhesion can be formed on at least one surface of the substrate including the thermoplastic resin and the inorganic substance powder in a mass ratio of 50:50 to 10:90, and the laminated structure in which a gas barrier property and oil resistance are excellent and, for example, excellent improvement in performances from the viewpoint of moisture, odor transfer, and freshness retention of the commercial product can be exhibited in the case of the use as the food packaging container can be provided.

DESCRIPTION OF EMBODIMENTS

Hereinafter, the present invention will be described in detail with reference to embodiments.

«Laminated Structure»

Figure 1:
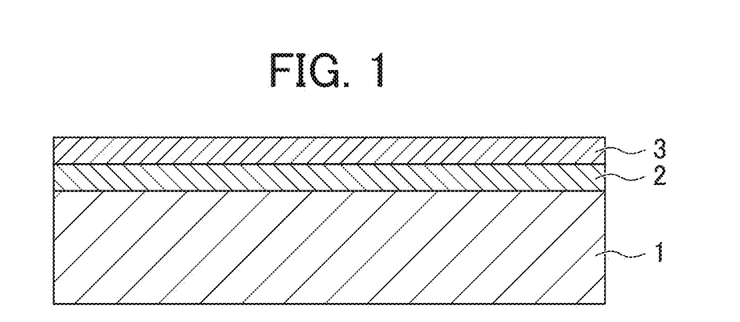
FIG. 1 is a sectional view schematically illustrating a layer constitution in one embodiment of the laminated structure according to the present invention.
Figure 2:
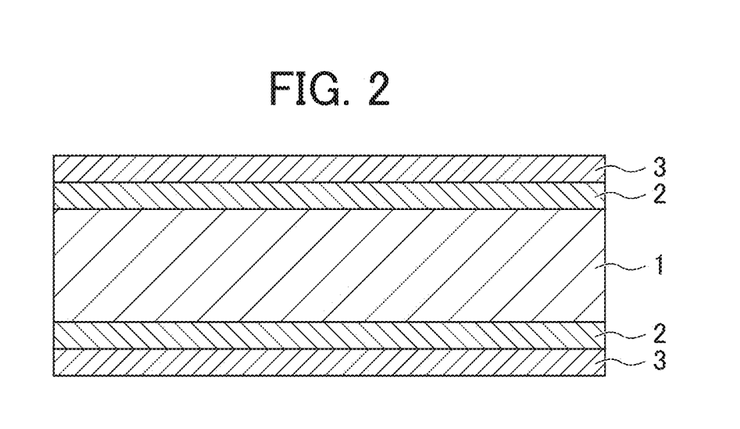
FIG. 2 is a sectional view schematically illustrating a layer constitution in another embodiment of the laminated structure according to the present invention.

FIG. 1 and FIG. 2 are sectional views schematically illustrating layer structures in each embodiment of the laminated structure according to the present invention. In FIG. 1 and FIG. 2, the thickness of each layer is drawn in an exaggerated manner.

As schematically illustrated in FIG. 1 and FIG. 2, the laminated structure according to the present invention includes a substrate 1 including a thermoplastic resin and an inorganic substance powder in a mass ratio of 50:50 to 10:90, a first coating layer 2 formed by blending clay in a proportion of 35% by mass or more and 65% by mass or less and light calcium carbonate in a proportion of 5% by mass or more and 30% by mass or less in a continuous phase made of an acrylic polymer formed on at least one surface of the substrate, and a second coating layer 3 including a polyvinylidene chloride-based resin formed on the first coating layer 2.

As illustrated in FIG. 1, the first coating layer 2 and the second coating layer 3 may be provided on an arbitrary one surface side of the substrate 1 or as illustrated in FIG. 2, each of the first coating layer 2 and the second coating layer 3 may be provided on both surface sides.

As the laminated structure according to the present invention, other constitutions are not particularly limited as long as the laminated structure has the form in which the above first coating layer 2 and the second coating layer 3 are provided at least one surface of the substrate 1. For example, an intermediate layer having some kind of functions such as a sealant layer for improving adhesiveness between the substrate 1 and the first coating layer 2, an inner printing layer for imparting coloring, a pattern, and the like to the laminated structure, a shield layer, a protection layer on the substrate surface not provided with the first coating layer 2 or the second coating layer 3, a printing layer, or the like may be arbitrarily provided between the substrate 1 and the first coating layer 2.

(1) Substrate

As the substrate in the laminated structure according to the present invention, a sheet made of the inorganic substance powder-blended thermoplastic resin composition including the thermoplastic resin and the inorganic substance powder in a mass ratio of 50:50 to 10:90, in particular, a sheet made of the inorganic substance powder-blended thermoplastic plastic including the polyolefin-based resin and the inorganic substance powder in a ratio of 50:50 to 10:90 in a mass ratio is used, which is preferable from the viewpoint of environment properties and from the viewpoint that properties such as mechanical strength and heat resistance are excellent.

(Resin Component)

The resin constituting the inorganic substance powder-blended thermoplastic resin composition sheet is not particularly limited. Various resins may be used depending on, for example, the application and function of the laminated structure. Examples of the resin include polyolefin-based resins such as polyethylene-based resins, polypropylene-based resins, polymethyl-1-pentene, and ethylene-cyclic olefin copolymers; functional group-containing polyolefin-based resins such as ethylene-vinyl acetate copolymers, ethylene-acrylic acid copolymers, ethylene-methacrylic acid copolymers, metal salts of ethylene-methacrylic acid copolymers (ionomers), ethylene-acrylic acid alkyl ester copolymers, ethylene-methacrylic acid alkyl ester copolymers, maleic acid-modified polyethylene, and maleic acid-modified polypropylene; polyamide-based resins such as nylon-6, nylon-6,6, nylon-6,10, and nylon-6,12; thermoplastic polyester-based resins including aromatic polyester resins such as polyethylene terephthalate and its copolymer, polyethylene naphthalate, and polybutylene terephthalate and aliphatic polyester-based resins such as polybutylene succinate and polylactic acid; polycarbonate-based resins including aromatic polycarbonates and aliphatic polycarbonates; polystyrene-based resins such as atactic polystyrene, syndiotactic polystyrene, acrylonitrile-styrene (AS) copolymers, and acrylonitrile-butadiene-styrene (ABS) copolymers; polyvinyl chloride-based resins such as polyvinyl chloride and polyvinylidene chloride; polyphenylene sulfide; and polyether-based resins such as polyethersulfones, polyetherketones, and polyetheretherketones. These resins can be used singly or in combination of two or more of them.

Of these thermoplastic resins, the polyolefin-based resins, the aromatic polyester-based resins, and the aliphatic polyester-based resins are preferably used from the viewpoints of easy formability, performance aspects, economy aspects, and the like.

Here, the polyolefin-based resins refer to polyolefin-based resins containing an olefin component unit as a main component. Specific examples of the polyolefin-based resins include the polypropylene-based resin and the polyethylene-based resin as described above, and in addition polymethyl-1-pentene and ethylene-cyclic olefin copolymers, as well as a mixture of two or more of these resins. The above phrase "as a main component" means that the olefin component unit is contained in the polyolefin-based resin in an amount of 50% by mass or more. The content of the olefin component unit is preferably 75% by mass or more, more preferably 85% by mass or more, and further preferably 90% by mass or more. The method for producing the polyolefin-based resin used in the present invention is not particularly limited. The polyolefin-based resin may be obtained by any of methods using a Ziegler-Natta catalyst, a metallocene catalyst, oxygen, a radical initiator such as a peroxide, and the like.

Examples of the polypropylene-based resin include resins including a propylene component unit of 50% by mass or more. Examples of the resin include propylene homopolymers or copolymers of propylene and other α-olefins copolymerizable with propylene. Examples of the other α-olefins that can be copolymerized with propylene include α-olefins having a carbon number of 4 to 10 such as ethylene, 1-butene, isobutylene, 1-pentene, 3-methyl-1-butene, 1-hexene, 3,4-dimethyl-1-butene, 1-heptene, and 3-methyl-1-hexene. As the propylene homopolymers, any of isotactic polypropylene, syndiotactic polypropylene, atactic polypropylene, hemiisotactic polypropylene, and linear or branched polypropylene exhibiting various stereoregularities are included. The above copolymer may be a random copolymer or a block copolymer and may be not only a binary copolymer but also a ternary copolymer. Specifically, examples thereof include an ethylene-propylene random copolymer, a butene-1-propylene random copolymer, an ethylene-butene-1-propylene random ternary copolymer, and an ethylene-propylene block copolymer.

Examples of the polyethylene-based resin include resins having an ethylene component unit of 50% by mass or more. Examples of the polyethylene-based resin include high-density polyethylene (HDPE), low-density polyethylene (LDPE), medium-density polyethylene, linear low-density polyethylene (LLDPE), an ethylene-vinyl acetate copolymer, an ethylene-propylene copolymer, an ethylene-propylene-butene-1 copolymer, an ethylene-butene-1 copolymer, an ethylene-hexene-1 copolymer, an ethylene-4-methylpentene-1 copolymer, an ethylene-octene-1 copolymer, and a mixture of two or more of these resins.

Of the above-described polyolefin-based resins, the polypropylene-based resins are preferably used because they have a particularly excellent balance between mechanical strength and heat resistance.

(Inorganic Substance Powder)

The inorganic substance powder that can be blended in the inorganic substance powder-blended thermoplastic resin composition sheet used as the substrate is not particularly limited. Examples of the inorganic substance powder include powder of carbonates, sulfates, silicates, phosphates, borates, and oxides of calcium, magnesium, aluminum, titanium, iron, zinc, and the like, or hydrates thereof. Specific examples of the inorganic substance powder include powder of calcium carbonate, magnesium carbonate, zinc oxide, titanium oxide, silica, alumina, clay, talc, kaolin, aluminum hydroxide, magnesium hydroxide, aluminum silicate, magnesium silicate, calcium silicate, aluminum sulfate, magnesium sulfate, calcium sulfate, magnesium phosphate, barium sulfate, silica sand, carbon black, zeolite, molybdenum, diatomaceous earth, sericite, shirasu, calcium sulfite, sodium sulfate, potassium titanate, bentonite, and graphite. These inorganic substance powders may be synthetic products or products originated from natural minerals. The inorganic substance powder may be used singly or in combination of two or more of them.

The shape of the inorganic substance powder is not particularly limited and may be any of a particle shape, a flake shape, a granule shape, and a fiber shape. The particle shape may be a spherical shape so as to be generally obtained by a synthesis method or an irregular shape so as to be obtained by pulverizing natural minerals.

As the inorganic substance powder, calcium carbonate, magnesium carbonate, zinc oxide, titanium oxide, silica, alumina, clay, talc, kaolin, aluminum hydroxide, magnesium hydroxide, and the like are preferable and calcium carbonate is particularly preferable. The calcium carbonate may be any of what is called light calcium carbonate prepared by a synthesis method and what is called heavy calcium carbonate obtained by mechanically pulverizing and classifying a natural raw material including $CaCO_3$ as the main component such as limestone, and the combination of these is also applicable. From the viewpoint of economic efficiency, the heavy calcium carbonate is preferable.

Here, the heavy calcium carbonate is a product obtained by mechanically pulverizing and processing natural limestone or the like and is clearly distinguished from synthetic calcium carbonate produced by chemical precipitate reaction or the like. The pulverizing method includes a dry method and a wet method. From the viewpoint of economic efficiency, the dry method is preferable.

In order to enhance the dispersibility of the inorganic substance powder in the thermoplastic resin, the surface of the calcium carbonate particles may be previously modified in accordance with the common methods. Examples of the surface modification method include a method of physical treatment such as plasma treatment and a method of chemical treatment of the surface with a coupling agent or a surfactant. Examples of the coupling agent include a silane coupling agent and a titanium coupling agent. As the surfactant, any of an anionic surfactant, a cationic surfactant, a nonionic surfactant, and an amphoteric surfactant may be used. Examples of the surfactant include a higher fatty acid, a higher fatty acid ester, a higher fatty acid amide, and a higher fatty acid salt.

The inorganic substance powder is preferably particles and the average particle diameter is preferably 0.1 µm or more and 20.0 µm or less, more preferably 1.0 µm or more and 10.0 µm or less, and further preferably 1.0 µm or more and 5.0 µm or less. The average particle diameter of the inorganic substance powder described in the present specification refers to a value calculated from the measurement result of the specific surface area by the air permeation method in accordance with JIS M-8511. As a measurement device, for example, a specific surface area measurement apparatus Type SS-100 manufactured by SHIMADZU CORPORATION can be preferably used. In particular, particles having a particle diameter of more than 50.0 µm are preferably excluded in the particle diameter distribution thereof. On the other hand, excessively fine particles cause the viscosity at the time of kneading with the above thermoplastic resin to be significantly increased and thus the production of the formed body may be difficult. Therefore, the average particle diameter of the particles is preferably determined to be 0.5 µm or more.

The shape of the inorganic substance powder may be a fiber shape, a powder shape, a flake shape, or a granule shape.

The average fiber length of the inorganic substance powder having the fiber shape is preferably 3.0 µm or more and 20.0 µm or less. The average fiber diameter is preferably 0.2 µm or more and 1.5 µm or less. The aspect ratio is usually 10 or more and 30 or less. The average fiber length and the average fiber diameter of the inorganic substance powder having the fiber shape are measured by observation using an electron microscope and the aspect ratio is a ratio of the average fiber length to the average fiber diameter (Average fiber length/Average fiber diameter).

The blend ratio (% by mass) of the thermoplastic resin and the inorganic substance powder included in the inorganic substance powder-blended thermoplastic resin composition sheet serving as the substrate is desirably in a ratio of 50:50 to 10:90, more preferably in a ratio of 40:60 to 20:80, and further preferably 40:60 to 25:75. This is because in the case where the proportion of the inorganic substance powder is lower than 50% by mass in the blending proportions of the thermoplastic resin and the inorganic substance powder, a given texture and physical properties such as impact resistance of the inorganic substance powder-blended thermoplastic resin composition due to the blend of the inorganic substance powder cannot be obtained, whereas in the case where the proportion is higher than 90% by mass, forming processing by, for example, extrusion forming or vacuum forming becomes difficult.

(Other Additives)

In the inorganic substance powder-blended thermoplastic resin composition sheet used as the substrate, other additives as auxiliary agents can be blended in the composition of the sheet, if necessary. Examples of the other additives include plasticizers, colorants, lubricating agents, coupling agents, flowability improvers, dispersing agents, antioxidants, ultraviolet ray absorbers, flame retardants, stabilizers, antistatic agents, and foaming agents. These additives may be used singly or in combination of two or more of them.

The inorganic substance powder-blended thermoplastic resin composition sheet used as the substrate may be unstretched, or may be uniaxially or biaxially stretched in the vertical or horizontal direction, or the like.

The thickness of the substrate is not particularly limited and is usually 10 µm or more and 300 µm or less and preferably 25 µm or more and 200 µm or less.

In the case where the substrate made of the inorganic substance powder-blended thermoplastic resin composition sheet is used, one surface or both surfaces of the substrate may be subjected to surface treatment by an oxidation method, an irregularity formation method, or the like for the purpose of improving the adhesiveness to the first coating layer provided on the surface of the substrate, if desired. Examples of the oxidation method include corona discharge treatment, flame treatment, plasma treatment, glow discharge treatment, chromic acid treatment (wet), flame treatment, hot air treatment, and ozone/ultraviolet irradiation treatment. Examples of the irregularity formation method include a sandblasting method and a solvent treatment method. However, in the present invention, forming the first coating layer as described below allows the adhesiveness between the substrate and the second coating layer to be improved and thus the surface treatment as described above is not particularly required.

(2) First Coating Layer

The first coating layer 2 that the laminated structure according to the present invention has is formed by adding clay in a proportion of 35% by mass or more and 65% by mass or less, more preferably 40% by mass or more and 60% by mass or less, and further preferably 45% by mass or more and 55% by mass or less and light calcium carbonate in a proportion of 5% by mass or more and 30% by mass or less, more preferably 7% by mass or more and 20% by mass or less, and further preferably 9% by mass or more and 15% by mass or less in a continuous phase of an acrylic polymer serving as a matrix.

In the first coating layer 2, the well-balanced presence of the clay and the light calcium carbonate in the above predetermined amounts in the continuous phase made of the acrylic polymer provides improvement in adhesion due to an anchor effect caused by forming the physical irregularities at the bonding interface with the substrate and at the bonding interface with the second coating layer described below. The presence of the clay in the continuous phase made of the acrylic polymer allows resistivity, in particular surface resistivity to be reduced and thus the antistatic performance is exhibited in the case where the laminated structure is used as the container product or the like, resulting in allowing attachment of dusts due to charging static electricity to be prevented. The presence of the light calcium carbonate in the continuous phase made of the acrylic polymer allows the oil resistance to be improved.

The first coating layer 2 having a blend amount of clay of less than the above range may cause reduction in the adhesion with the substrate 1 and may fail to achieve sufficient reduction in the surface resistivity of the sheet due to the blend of clay. On the other hand, the first coating layer 2 having a blend amount of clay of more than the above range may cause water resistance to deteriorate and the appearance to be affected and the first coating layer 2 may fail to be formed as a continuous layer having sufficient strength.

Hereinafter, each component forming such a first coating layer 2 will be described in detail.

(Acrylic Polymer Forming Continuous Phase)

Examples of the acrylic polymer serving as the matrix of the first coating layer 2 include polymers obtained by using (meth)acrylic acid, (meth)acrylic acid esters, (meth)acrylamides, and (meth)acrylonitrile as main monomer components. The term "(meth)acrylic" used in the present specification is used in the meaning that the term includes both "acrylic" and "methacrylic".

Although not particularly limited, more specific examples of the monomer components constituting the acrylic polymers include various acrylic monomers such as acrylic acid and methacrylic acid;

acrylic acid alkyl esters having a carbon number of 1 to 18 such as methyl acrylate, ethyl acrylate, n-propyl acrylate, isopropyl acrylate, n-butyl acrylate, isobutyl acrylate, t-butyl acrylate, hexyl acrylate, n-octyl acrylate, 2-ethylhexyl acrylate, isooctyl acrylate, nonyl acrylate, lauryl acrylate, stearyl acrylate, palmityl acrylate, or cyclohexyl acrylate;

methacrylic acid alkyl esters having a carbon number of 1 to 18 such as methyl methacrylate, ethyl methacrylate, n-propyl methacrylate, isopropyl methacrylate, n-butyl methacrylate, isobutyl methacrylate, t-butyl methacrylate, hexyl methacrylate, n-octyl methacrylate, 2-ethylhexyl methacrylate, nonyl methacrylate, lauryl methacrylate, stearyl methacrylate, palmityl methacrylate, and cyclohexyl methacrylate;

alkyl esters having a hydroxy group on the side chain of (meth)acrylic acid such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, and monohydroxyethyl phthalate acrylate;

polyethylene glycol diacrylate having an ethylene glycol unit in the molecule (n is preferably 3 or more and 20 or less), trimethylolpropane EO-modified triacrylate (n is preferably 3 or more and 20 or less), and phenol EO modified acrylate (n is preferably 3 or more and 20 or less);

alkenyloxyalkyl esters of (meth)acrylic acids such as allyloxyethyl acrylate and allyloxyethyl methacrylate;

alkyl esters having an alkoxyl group on the side chain of (meth)acrylic acid such as methoxybutyl acrylate, methoxybutyl methacrylate, methoxyethyl acrylate, methoxyethyl methacrylate, ethoxybutyl acrylate, and ethoxybutyl methacrylate;

alkenyl esters of (meth)acrylic acids such as allyl acrylate and allyl methacrylate;

alkyl esters having an epoxy group on the side chain of acrylic acid such as glycidyl acrylate, glycidyl methacrylate, methyl glycidyl acrylate, and methyl glycidyl methacrylate;

mono- or di-alkylaminoalkyl esters of (meth)acrylic acids such as diethylaminoethyl acrylate, diethylaminoethyl methacrylate, methylaminoethyl acrylate, and methylaminoethyl methacrylate;

silicone-modified (meth)acrylic acid esters having a silyl group, an alkoxysilyl group, a hydrolyzable alkoxysilyl group, or the like as a side chain;

acrylamide and methacrylamide;

(meth)acrylamides having a methylol group such as N-methylolacrylamide and N-methylolmethacrylamide;

(meth)acrylamide having an alkoxymethylol group such as N-alkoxymethylolacrylamides (for example, N-isobutoxymethylolacrylamide) and N-alkoxymethylolmethacrylamides (for example, N-isobutoxymethylolmethacrylamide);

(meth)acrylamides having an alkoxyalkyl group such as N-butoxymethylacrylamide and N-butoxymethylmethacrylamide and, acrylonitrile and methacrylonitrile.

In the case where a crosslinked structure is introduced into the acrylic polymer by a photocuring reaction or the like to increase the film strength of the first coating layer 2, a bifunctional or polyfunctional acrylic monomer, specifically, for example, polyfunctional (meth)acrylates such as 1,4-butanediol di(meth)acrylate, 1,6-hexanediol di(meth)acrylate, neopentyl glycol di(meth)acrylate, polyethylene glycol di(meth)acrylate, neopentyl glycol hydroxypivalate di(meth)acrylate, dicyclopentanyl di(meth)acrylate, caprolactone-modified dicyclopentenyl di(meth)acrylate, ethylene oxide-modified phosphate di(meth)acrylate, allylated cyclohexyl di(meth)acrylate, isocyanurate di(meth)acrylate, trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris (acryloxyethyl) isocyanurate, pentaerythritol tetra(meth) acrylate, dipentaerythritol penta(meth)acrylate, propionic acid-modified dipentaerythritol penta(meth)acrylate, dipentaerythritol hexa(meth)acrylate, and caprolactone-modified dipentaerythritol hexa(meth)acrylate may be blended.

These monomer components can be used singly or in combination of two or more of them.

Namely, the acrylic polymer constituting the continuous phase of the first coating layer 2 in the present invention may be a homopolymer constituted of only one of the various monomer components exemplified above or a copolymer formed by combining the various monomer components exemplified above.

In one embodiment of the present invention, a copolymer containing other monomer components in addition to the above monomer components can be used as the acrylic polymer.

The monomer components other than the above monomer components exemplified above are not particularly limited as long as the monomer components form a copolymer with the monomer components exemplified above. Examples of the monomer components other than the monomer components exemplified above include vinyl-based monomers such as vinyl acetate, vinyl chloride, vinylidene chloride, vinyl lactate, vinyl butyrate, vinyl versatate, and vinyl benzoate, and ethylene, butadiene, and styrene.

The method for forming the first coating layer 2 in the laminated structure according to the present invention is not particularly limited. Generally, from the excellent coatability for forming such a first coating layer 2, the acrylic polymer is desirably used in the form of a dispersed product in water or a dissolved product in an organic solvent and in particular, the form of the dispersed product in water, that is, a form of an acrylic polymer aqueous emulsion is desirable. Therefore, the acrylic polymer preferably has the form of the aqueous emulsion at the stage of the raw material for forming the first coating layer 2.

The emulsion polymerization itself in producing the acrylic polymer aqueous emulsion has been publicly well known to those skilled in the art. As the surfactant used in this emulsion polymerization, anionic surfactants, cationic surfactants, amphoteric surfactants, and nonionic surfactants can be used singly or in combination of two or more of them. Of these surfactants, the nonionic surfactants and the cationic surfactants are preferable. Although not particularly limited, examples of the nonionic surfactants include polyoxyethylene alkyl ethers, polyoxyethylene alkylphenyl ethers, polyoxyethylene alkyl esters, sorbitan alkyl esters, and polyoxyethylene sorbitan alkyl esters. Although not particularly limited, examples of the cationic surfactants include dodecyltrimethylammonium chloride, stearyltrimethylammonium chloride, and N-2-ethylhexylpyridinium chloride. The most preferable surfactants are the nonionic surfactants. Of these nonionic surfactants, polyoxyethylene alkylphenyl ethers are particularly preferable. Although not particularly limited, the surfactant used is usually an amount of 1% by mass to 5% by mass relative to the total amount of the monomers.

A water-soluble polymer such as gelatin or polyvinyl alcohol may be used together as a protective colloid agent.

As a radical polymerization initiator for the emulsion polymerization, water-soluble type initiators including persulfates such as potassium persulfate and ammonium persulfate, a hydrogen peroxide solution, t-butyl hydroperoxide, and azobisamidinopropane hydrochloride, and oil-soluble type initiators such as benzoyl peroxide, diisopropylperoxydicarbonate, cumylperoxyneodecanoate, cumylperoxyoctoate, and azobisisobutyronitrile are exemplified. The water-soluble type initiators are preferable. Although not particularly limited, for example, the amount of the polymerization initiator is in a proportion of 0.01% by mass to 0.50% by mass relative to the total amount of the monomers.

Although not particularly limited, the polymerization reaction is usually carried out under stirring at a temperature of 35° C. to 90° C. The reaction time is usually 3 hours to 40 hours. Adjusting pH by adding a basic substance at the start or end of emulsion polymerization allows the leaving stability, freezing stability, chemical stability, and the like of the emulsion to be improved. In this case, the pH of the obtained emulsion is preferably adjusted to 5 to 9. For this purpose, basic substances such as ammonia, ethylamine, diethylamine, triethylamine, ethanolamine, triethanolamine, dimethylethanolamine, caustic soda, and caustic potash may be used.

Although not particularly limited, as the acrylic polymer serving as the matrix of the first coating layer, an alkyl (meth)acrylate can be preferably exemplified.

(Clay)

In the present invention, the clay is blended in a predetermined proportion in combination with the light calcium carbonate described below in the continuous phase of the acrylic polymer serving as the matrix.

The clay used in the present invention is not particularly limited and known clay can be appropriately used. In the present specification, "clay" includes not only clay minerals having a layered structure but also clay minerals having no layered structure such as imogolite and allophane. Examples of the clay minerals having a layered structure include swelling minerals such as smectite, vermiculite, montmorillonite, bentonite, illite, hectorite, halloysite, saponite, beidellite, stevensite, nontronite, smectite, mica, brittle mica, sericite (silk mica), illite, glauconite, and hydrotalcite; and non-swelling minerals such as kaolin mineral (kaolinite), serpentine, pyrophyllite, talc, chlorite, and zeolite. Examples of such clay include natural clay, synthetic clay, and organoclay.

The organoclay is not particularly limited and any known organoclay can be included. The organoclay is preferably clay that is organized by an organizing agent. The clay before being organized is not particularly limited as long as the clay is what is called a clay mineral and any clay as exemplified above may be used. Such clay may be a natural product or a synthetic product.

The organizing agent is not particularly limited and a known organizing agent capable of organizing clay can be appropriately used. Examples of the organizing agent to be used include hexyl ammonium ion, octyl ammonium ion, 2-ethylhexyl ammonium ion, dodecyl ammonium ion, lauryl ammonium ion, octadecyl ammonium ion, dioctyl dimethyl ammonium ion, trioctyl ammonium ion, dioctadecyl dimethyl ammonium ion, trioctyl ammonium ion, dioctadecyl dimethyl ammonium ion, and trioctadecyl ammonium ion.

The clay used in the present invention is not particularly limited. From the viewpoint of uniform dispersibility in the first coating layer 2, kaolin clay is particularly preferable.

The particle diameter of this clay is not particularly limited and depends to some extent on the thickness of the first coating layer 2 to be formed. The clay desirably has an average particle diameter of 0.2 times or more and 2.0 times or less and more preferably 0.5 times or more and 0.8 times or less relative to the thickness of the first coating layer to be formed. More specifically, for example, the volume average particle diameter is preferably 0.1 µm or more and 10.0 µm or less, more preferably 0.15 µm or more and 8.0 µm or less, and further preferably 0.2 µm or more and 6.0 µm or less. The clay having such a particle diameter range allows the clay to be blended in the first coating layer 2 to be formed with excellent dispersibility and the given effects such as improvement in the adhesion between the substrate 1 and the second coating layer 3, improvement in the oil resistance, and improvement in the antistatic performance to be preferably exhibited.

The shape of the clay is not particularly limited. The shape may be any of an elliptical spherical shape, a flat shape, or an irregular shape. The shape, however, is desirably close to a spherical shape to some extent from the viewpoint of uniform dispersibility in the first coating layer 2. From this viewpoint, the aspect ratio of the clay is preferably 5 or less, more preferably 3 or less, and further preferably 2 or less. The aspect ratio represents major axis/minor axis.

As the clay, approximately uniform particle size among the particles is desirable in order to provide uniform in-plane properties of the first coating layer 2.

The specific gravity of the clay is not particularly limited. For example, the specific gravity is desirably 1.5 to 3.0 and more preferably 2.0 to 2.8 in order to provide uniform dispersion in the entire first coating layer 2 to be formed.

(Light Calcium Carbonate)

In the present invention, the first coating layer 2 can include light calcium carbonate together with the clay. As described above, "light calcium carbonate" is calcium carbonate produced by a synthetic method and is distinguished from heavy calcium carbonate obtained by mechanically pulverizing and classifying a natural raw material including $CaCO_3$ as the main component such as limestone. The reason why the light calcium carbonate is used in combination with the clay instead of heavy calcium carbonate or other inorganic fine particles is that the first coating layer 2 can be smoothed when the light calcium carbonate is used in combination with the clay.

The method for producing light calcium carbonate is not particularly limited. In the present invention, light calcium carbonate obtained by any known method can be used. Examples of the method include a carbon dioxide gasification method or a soluble salt reaction method. The carbon dioxide gasification method is a method in which quick lime obtained by calcinating limestone is dissolved in water to form lime milk and carbon dioxide gas is reacted with the lime milk to produce light calcium carbonate. The soluble salt reaction method is a method in which a calcium chloride solution and sodium carbonate are reacted with lime milk to produce light calcium carbonate. The crystal form, size, and shape of light calcium carbonate can be controlled by the reaction conditions and the like.

The particle diameter of the light calcium carbonate used in the present invention is not particularly limited. For example, the volume average particle diameter is preferably 0.02 μm or more and 2.00 μm or less and more preferably 0.02 μm or more and 1.00 μm. The light calcium carbonate having such a particle diameter range allows the smoothing of the first coating layer 2 to be excellent.

(Other Additives)

In the present invention, the first coating layer 2 may include other components such as additives other than the above components. Specific examples of the additives include crosslinking agents, pH adjusters, thickeners, fluidity improvers, defoaming agents, foam suppressors, surfactants, mold release agents, penetrants, coloring pigments, coloring dyes, fluorescent whitening agents, ultraviolet ray absorbers, antioxidants, preservation agents, fungicides, water resistant agents, curing agents, and weather resistant material.

Examples of the crosslinking agent include aldehyde-based compounds, melamine-based compounds, isocyanate-based compounds, zirconium-based compounds, titanium-based compounds, amide-based compounds, aluminum-based compounds, boric acid, borates, carbodiimide-based compounds, and oxazoline-based compounds.

The defoaming agents are not particularly limited. For example, mineral oil-based defoaming agents, polyether-based defoaming agents, and silicone-based defoaming agents are used. The mineral oil-based defoaming agents are preferable. The mineral oil-based defoaming agent is not particularly limited. The hydrophobic silica type mineral oil-based defoaming agents are not particularly limited. Examples thereof include Nopco 8034, Nopco 8034-L, SN Deformer AP, SN Deformer H-2, SN Deformer TP-33, SN deformer VL, SN deformer 113, SN deformer 154, SN deformer 154S, SN deformer 313, SN deformer 314, SN deformer 316, SN deformer 317, SN deformer 318, SN deformer 319, SN deformer 321, SN deformer 323, SN deformer 364, SN deformer 414, SN deformer 456, SN deformer 474, SN deformer 476-L, SN deformer 480, SN deformer 777, SN deformer 1341, and SN deformer 1361 (manufactured by SAN NOPCO LIMITED), and BYK-1740 (manufactured by BYK-Chemie GmbH). The metal soap type mineral oil-based defoaming agents are not limited to the followings. Examples thereof include Nopco DF-122, Nopco DF-122-NS, Nopco NDW, Nopco NXZ, SN Deformer 122-SV, SN Deformer 269, and SN Deformer 1010 (manufactured by SAN NOPCO LIMITED). The amide wax type mineral oil-based defoaming agents are not particularly limited. Examples thereof include Nopco 267-A, Nopco DF-124-L, SN Defoamer TP-39, SN Defoamer 477T, SN Defoamer 477-NS, SN Defoamer 479, SN Defoamer 1044, SN Defoamer 1320, SN Defoamer 1340, SN Defoamer 1360, and SN Defoamer 5100 (manufactured by SAN NOPCO LIMITED). These defoaming agents may be used singly or may be used in combination of two or more of them. The amount of the defoaming agent used is not particularly limited, and is desirably 0.01% by mass to 0.03% by mass relative to the entire coating liquid forming the first coating layer.

Fine particles other than the clay and the light calcium carbonate may be added to the first coating layer 2 according to the present invention as long as the fine particles do not inhibit the excellent effect described above exhibited by using the clay and the light calcium carbonate together within the range of the predetermined amount. However, it is desired that the other fine particles are substantially not included.

For example, in the case where the acrylic polymer aqueous emulsion is used as the acrylic polymer to be the matrix of the first coating layer 2, the coating liquid for forming the first coating layer 2 can be prepared by adding the clay or the dispersion thereof in water or the like and the light calcium carbonate or a dispersion thereof in water or the like into water that is a dispersion medium of the acrylic polymer aqueous emulsion and dispersing the resultant mixture using an appropriate mixer or dispersing apparatus such as a wet colloid mill, an edged turbine, and a paddle blade at a rotation condition of 500 rpm to 3,000 rpm for usually 1 minute to 5 minutes. When the clay and the light calcium carbonate are charged into the acrylic polymer aqueous emulsion as they are, agglomeration may occur. Therefore, the clay and/or the light calcium carbonate is desirably blended in the acrylic polymer aqueous emulsion after a dispersion in which the clay and/or the light calcium carbonate is dispersed in a medium such as water is previously prepared with the dispersing agent being blended, if necessary. The specific gravities of the clay and the light calcium carbonate are almost equal and thus each of the clay and light calcium carbonate does not exist in a state of uneven distribution and thus both can be dispersed in a state of uniform distribution.

The thickness of this first coating layer 2 is not particularly limited and is, for example, preferably 1 µm or more and 10 µm or less, more preferably 2 µm or more and 8 µm or less, and particularly preferably 3 µm or more and 5 µm or less. The first coating layer 2 having the thickness within this range and serving as the undercoat layer also allows the properties such as the adhesiveness between the substrate 1 and the second coating layer 3, the water resistance of the laminated structure, and the antistatic property of the surface to be excellent.

(3) Second Coating Layer

The second coating layer 3 that the laminated structure according to the present invention has includes a polyvinylidene chloride-based resin.

The second coating layer 3 is laminated on the surface of the substrate 1 with excellent adhesiveness through the first coating layer 2, whereby the gas barrier property, oil resistance, chemical resistance, and a moisture-proof property, and in addition, flame retardancy and high frequency sealing can be provided to the laminated structure. As described above, in the laminated structure according to the present invention, the inorganic substance powder-blended thermoplastic resin composition is used as the substrate 1. Forming such a second coating layer including the polyvinylidene chloride-based resin allows the problems in that the inorganic substance powder falls off during the use and calcium carbonate, which is used as an inorganic substance powder, is eluted into food, in particular liquid food such as strongly acidic beverages to be solved.

The second coating layer 3 is not particularly limited as long as the second coating layer 3 includes the polyvinylidene chloride-based resin and at least exhibits a sufficient gas barrier property. For example, a film product formed from a resin composition including polyvinylidene chloride or a polyvinylidene chloride latex can be used. Of these materials, the material in the form of polyvinylidene chloride latex is preferable. With the form of the latex, the first coating layer 2 is formed by applying an acrylic polymer aqueous emulsion or the like as the base in the form of an emulsion and drying the applied emulsion as described above, and thereafter, the second coating layer can be formed by applying the polyvinylidene chloride latex in the same working environment. Therefore, working efficiency is excellent and the adhesiveness between the first coating layer 2 and the second coating layer 3 is also excellent. In the case of the film product, for example, a polyvinylidene chloride film can be formed on the first coating layer 2 by heat fusion or the like after the first coating layer 2 is formed.

(Polyvinylidene Chloride Latex)

As is known, the polyvinylidene chloride latex preferably used for forming the second coating layer 3 refers to a product in which a polyvinylidene chloride-based resin is dispersed or emulsified in water.

The polyvinylidene chloride-based resin may be a polymer of vinylidene chloride alone or may be a copolymer with another monomer.

Examples of the copolymerizable monomer include vinyl chloride, acrylic acid esters such as methyl acrylate, ethyl acrylate, butyl acrylate, 2-ethylhexyl acrylate, and 2-hydroxyethyl acrylate, methacrylic acid esters such as methyl methacrylate and glycidyl methacrylate, acrylonitrile, methacrylonitrile, and unsaturated carboxylic acids such as acrylic acid, methacrylic acid, itaconic acid, and maleic acid. These monomers may be used singly or in combination of two or more of them.

The vinylidene chloride content in the polyvinylidene chloride-based resin is required to be at least 50% by mass or more, preferably 75% by mass or more, more preferably 85% by mass or more, and further preferably 90% by mass or more in order to exhibit a sufficient gas barrier property.

An emulsifier such as a surfactant or a pH adjuster such as ammonia may be added to the polyvinylidene chloride latex, if necessary.

As the surfactant, anionic surfactants, cationic surfactants, amphoteric surfactants, and nonionic surfactants can be used singly or in combination of two or more of them. Of these surfactants, the nonionic surfactants and the cationic surfactants are preferable. Although not particularly limited, examples of the nonionic surfactants include polyoxyethylene alkyl ethers, polyoxyethylene alkylphenyl ethers, polyoxyethylene alkyl esters, sorbitan alkyl esters, and polyoxyethylene sorbitan alkyl esters. Although not particularly limited, examples of the cationic surfactants include dodecyltrimethylammonium chloride, stearyltrimethylammonium chloride, and N-2-ethylhexylpyridinium chloride. Although not particularly limited, the surfactant is usually used in an amount of 0.01% by mass to 1.00% by mass relative to the total amount of the latex.

A water-soluble polymer such as gelatin or polyvinyl alcohol may be used together as a protective colloid agent.

The second coating layer 3 serves as the outermost surface of the laminated structure and serves as a heat-sealing surface. Therefore, a given lubricant may be added in order to improve slipperiness and an anti-blocking agent may be added in order to prevent blocking.

As the polyvinylidene chloride latex, a commercially available product can be used as it is or after being diluted, or the like. Specifically, for example, Saran Latex (manufactured by Asahi Kasei Corporation), Kanebarrier (manufactured by KANEKA CORPORATION), and Kurehalon Latex (manufactured by Kureha Corporation) can be preferably used.

(Polyvinylidene Chloride Film)

The polyvinylidene chloride film that can be used to form the second coating layer 3 is a product formed by melt-extruding the polyvinylidene chloride-based resin by a known method in a form of a film and stretching the extruded film. Although the stretching may be uniaxial stretching, biaxial stretching or multi-axial stretching (for example, inflation forming) is preferable because cracks are less likely to be generated.

Similarly to the case of the latex described above, the polyvinylidene chloride-based resin forming the film product may be a polymer of vinylidene chloride alone or a copolymer with another monomer. The copolymer is preferable in order to improve extrusion processing properties.

Examples of the copolymerizable monomer include vinyl chloride, acrylic acid esters such as methyl acrylate, ethyl acrylate, butyl acrylate, 2-ethylhexyl acrylate, and 2-hydroxyethyl acrylate, methacrylic acid esters such as methyl methacrylate and glycidyl methacrylate, acrylonitrile, methacrylonitrile, and unsaturated carboxylic acids such as acrylic acid, methacrylic acid, itaconic acid, and maleic acid. These monomers may be used singly or in combination of two or more of them.

The content of vinylidene chloride in the polyvinylidene chloride-based resin is required to be at least 50% by mass or more, preferably 75% by mass or more, more preferably 85% y mass or more, and further preferably 90% by mass or more in order to exhibit a sufficient gas barrier property. A heat stabilizer, a plasticizer, a slipping agent, and the like may be added to the polyvinylidene chloride-based resin, if necessary.

The thickness of the second coating layer 3 formed by using the above latex or film is not particularly limited. For example, the thickness is preferably 2 μm or more and 30 μm or less, more preferably 4 μm or more and 20 μm or less, and further preferably 5 μm or more and 15 μm or less. The second coating layer 3 having the thickness within this range allows the properties such as the gas barrier property, oil resistance, water resistance, chemical resistance of the laminated structure, and adhesiveness between the first coating layer 2 and the second coating layer 3 to be excellent.

<Method for Producing Laminated Structure>

As the method for producing the laminated structure according to the present invention, conventional common methods for forming the coating layer on the substrate surface may be used. For example, the laminated structure can be produced by applying the coating liquid made of the acrylic polymer aqueous emulsion formed by blending the clay in a proportion of 35% by mass or more and 65% by mass or less and the light calcium carbonate in a proportion of 5% by mass or more and 30% by mass or less in a dried mass to one surface or both surfaces of the substrate 1 using an appropriate technique such as roll coating, blade coating, bar coating, brush coating, spray coating, and dipping and thereafter drying and curing to form the first coating layer 2, and subsequently applying the coating liquid made of the polyvinylidene chloride resin latex onto the first coating layer 2 formed on the first substrate 1 using appropriate technique such as roll coating, blade coating, bar coating, brush coating, spray coating, and dipping as similar to the above and thereafter drying and curing to form the second coating layer 3. The temperature conditions at the time of drying or curing the first coating layer 2 are not particularly limited. For example, drying or curing can be performed at a temperature of 90° C. to 120° C. The temperature conditions at the time of drying or curing the second coating layer 3 are not particularly limited. For example, drying or curing can be performed at a temperature of 90° C. to 120° C.

In the aspect in which the above sheet made of the inorganic substance powder-blended thermoplastic resin composition is used as the substrate 1, for example, a sheet including the polyolefin resin and the inorganic substance powder in a mass ratio of 50:50 to 10:90 is extruded and formed. The coating liquid made of the acrylic polymer aqueous emulsion formed by blending the clay in a proportion of 35% by mass or more and 65% by mass or less and the light calcium carbonate in a proportion of 5% by mass or more and 30% by mass or less in a dried mass is applied onto one surface or both surfaces of the substrate 1 obtained through the stretching treatment of the sheet by an appropriate method and thereafter the applied coating liquid is dried and cured, and subsequently the coating liquid made of the polyvinylidene chloride resin latex is applied by an appropriate method and thereafter the applied coating liquid is dried and cured to produce the laminated structure. In order to form the sheet made of the inorganic substance powder-blended thermoplastic resin composition, the inorganic substance powder and the thermoplastic resin can be mixed by kneading and melting the thermoplastic resin and the inorganic substance powder before the materials are fed from a hopper to a forming machine or simultaneously kneading and melting the thermoplastic resin and the inorganic substance powder at the time of forming using a forming machine. The same applies to other additives other than the inorganic substance powder. The kneading and melting are preferably carried out by applying high shear stress to the kneading while the inorganic substance powder is being uniformly dispersed in the thermoplastic resin and preferably carried out using a twin-screw kneader to knead. At the time of blending the inorganic substance powder with the thermoplastic resin, an aspect in which the mixture is treated at a temperature of the melting point of the thermoplastic resin +55° C. or lower, preferably at a temperature of the melting point of the thermoplastic resin or higher and the melting point of the thermoplastic resin +55° C. or lower, and further preferably at a temperature of the melting point of the thermoplastic resin +10° C. or higher and the melting point of the thermoplastic resin +45° C. or lower is preferable in view of the uniform melting and kneading.

The forming temperature at the time of extrusion forming into the sheet-like product is preferably the same temperature as the temperature described above.

The stretching treatment at the time of forming the sheet-like product is not particularly limited. The sheet-like product can be stretched in a uniaxial direction, biaxial directions, or multi-axial directions (for example, stretching by a tubular method) at the forming or after the forming of the sheet-like product. In the case of the biaxial stretching, the stretching may be sequential biaxial stretching or simultaneous biaxial stretching.

Stretching the sheet after forming (for example, longitudinal stretching and/or transverse stretching) results in decreasing the density of the sheet and thus the weight can be reduced.

In the case where the second coating layer 3 is formed by using the above polyvinylidene chloride-based resin film, the first coating layer 2 is formed on the surface of the substrate 1 and thereafter the polyvinylidene chloride-based resin film having a predetermined film thickness is placed on the first coating layer 2 and heat-sealed to form the second coating layer 3.

«Container Product»

The container product according to the present invention is a container product formed by using the above laminated structure.

The shape of the container product according to the present invention is not particularly limited and the container product may have various forms. For example, the container product may be a food packaging container or other container products.

The thickness of the container product according to the present invention is not particularly limited. The container product has various thicknesses from thin thickness to thick thickness due to mainly changing the thickness of the substrate 1 of the laminated structure depending on the form of the container product. For example, a container product having a thickness of 40 μm to 5,000 μm and more preferably a thickness of 50 μm to 1,000 μm is exemplified. The thickness within this range allows excellent moldability and workability to be obtained due to uniform dispersion of the inorganic substance powder in the thermoplastic resin, and thus the container product having no thickness deviations, being uniform with no defects can be produced.

The container product according to the present invention is used for, for example, packaging applications, sanitary applications, medical applications, healthcare applications, agricultural applications, horticultural applications, household applications, and industrial applications. In particular, the container product has excellent gas barrier property, oil resistance, chemical resistance, and the like and thus can be preferably used for packaging applications such as food packaging applications and chemical packaging applications and more particularly preferably can be used as the food packaging containers.

«Method for Producing Container Product»

The method for producing the container product of the present invention is not particularly limited as long as the container product can be formed into the desired shape. The substrate 1 serving as the base of the laminated structure can be formed and processed by any of methods such as conventionally known extrusion forming (including extrusion forming by an inflation method or the like), injection forming, vacuum forming, blow forming, and calendar forming. Furthermore, even in the case where the inorganic substance powder-filled resin composition according to the present invention includes a foaming agent to obtain the container product in the aspect of foamed products, any of conventionally known liquid phase foaming methods such as injection foaming, extrusion foaming, and blow foaming, or solid phase foaming methods such as bead foaming, batch foaming, press foaming, and normal pressure secondary foaming, which are conventionally known forming method of foamed products, can be used as long as a desired shape can be formed. After the first coating layer 2 and the second coating layer 3 are formed on the surface of the substrate 1, the desired shape can be processed by a secondary process such as vacuum forming.

EXAMPLES

Hereinafter, the present invention will be specifically described with reference to Examples. Examples are described only for the purpose of exemplifying the specific aspects and embodiments in order to more facilitate the understanding of the concept and scope of the present invention disclosed in the present specification and described in the attached CLAIMS and the present invention is not limited to Examples in any manner.

(Evaluation Methods)

Each physical property in Examples and Comparative Examples described below was evaluated in accordance with the following methods.

(Adhesiveness)

In order to examine the adhesiveness of the coating layer (first coating layer) to the substrate, a peeling test with a cellophane adhesive tape was performed.

Tape for Measurement

Cellophane adhesive tape (width: 24 mm) complying with JIS Z1522: 2009

Measurement Procedure (1) The tape is taken out in a length of about 75 mm.

(2) The tape is stuck on the sheet to be measured and the tape is rubbed with a finger so that the tape becomes almost transparent. At this time, the tape is pressed with the palm of the finger without scratching with a nail.

(3) Within 5 minutes after sticking the tape, the end of the tape is lifted so that the peeling direction and the first coating layer form an angle of about 60° and the tape is surely separate from the sheet in 0.5 second to 1.0 second. The peeled surface is observed. Whether the coating layer is attached is visually observed and the adhesiveness between the first coating layer and the substrate is evaluated in accordance with the following evaluation criteria.

Evaluation Criteria

○ No delamination of the coating layer exists.

Δ The delamination of the coating layer is less than 20%.

x The delamination of the coating layer is 20% or more.

(Calcium Carbonate Elution Property)

The calcium carbonate elution property was measured by the following method.

First, 500 g of a 4% by mass acetic acid aqueous solution was weighed and placed in a glass test container and heated in an oven to raise the temperature of the acetic acid aqueous solution to a predetermined temperature (60° C.). The sample was cut into 50 mm squares and the mass of each of the cut sample specimens was measured. The sample specimens were immersed into the acetic acid aqueous solution and allowed to stand for 30 minutes. After a lapse of 30 minutes and after a lapse of 24 hours, the sample specimen was taken out from the acetic acid aqueous solution. Water droplets were wiped off and the mass was measured. The change in the mass of the sample before and after the immersion in the acetic acid aqueous solution was measured.

(Gas Barrier Property)

In accordance with JIS K7126-1: 2006, the permeated gas was separated for each component with a gas chromatograph by the A method (differential pressure method) and the permeability of each component was measured. The gas barrier property was evaluated in accordance with the following evaluation criteria.

Evaluation Criteria

○ The laminated structure has a sufficient gas barrier property.

Δ The laminate structure has a slightly inferior gas barrier property, but the gas barrier property is practically acceptable.

x The laminate structure does not have the gas barrier property.

(Oil Resistance)

Oil was dropped on the surface of the sample. After a lapse of 10 minutes, the surface appearance after wiping was visually observed. The oil resistance was evaluated in accordance with the following evaluation criteria.

Evaluation Criteria

○ No change in the surface appearance.

Δ Slight change in the surface appearance.

x Significant change in the surface appearance.

(Water Resistance)

The surface of the sample was rubbed with Kimwipe (trade name manufactured by Nippon Paper Crecia) wet with water for 10 seconds. The surface appearance was visually observed and the water resistance was evaluated in accordance with the following evaluation criteria.

Evaluation Criteria

○ No change in the surface appearance.

Δ A slight amount of water mark appears on the surface appearance.

x A significant water mark appears on the surface appearance.

The constituents used in Examples and Comparative Examples were as follows.

Substrate

To an extrusion forming machine (T-die extrusion forming apparatus, diameter 20 mm, L/D=25) equipped with a twin-screw, 36.0 parts by mass of a polypropylene homopolymer (melting point 160° C.), 60.0 parts by mass of heavy calcium carbonate particles having an average particle diameter of 2.2 μm (an average particle diameter determined by an air permeation method) as the inorganic substance powder, and further 2.0 parts by mass of sodium alkanesulfonate (alkyl group having a carbon number (average value) of 12) as a lubricating agent were charged. The charged raw materials were kneaded at a temperature of 220° C. or lower.

The kneaded raw material was formed into a sheet with a T-die at a forming temperature of 220° C. and the sheet was stretched while being wound by a winder to prepare a sheet made of the inorganic substance powder-blended thermoplastic resin composition serving as the substrate. The thickness of thus obtained sheet was 200 μm.

First Coating Layer

The first coating layer coating liquid was prepared by blending each kaolin clay (volume average particle diameter 0.6 μm, specific gravity 2.6) and light calcium carbonate (volume average particle diameter 1.00 μm, specific gravity 2.6) so that a ratio of the (meth)acrylic acid alkyl ester copolymer:kaolin clay:light calcium carbonate is in a ratio of 40:50:10 in a mass ratio (in terms of dried mass) to a (meth)acrylic acid alkyl ester copolymer aqueous emulsion (solid content:water=50:50 (mass ratio)) including n-butyl acrylate, methyl methacrylate, 2-ethylhexyl acrylate, methacrylic acid, vinyl acetate, and a rosin derivative in a ratio of 26:16:44:8:6:3 in a mass ratio and stirring and mixing the resultant mixture at 3,000 rpm for 3 minutes using an edged turbine. The dispersion medium of the first coating layer coating liquid was water and the solid content concentration was determined to be 46% by mass. Furthermore, in the first coating layer coating liquid, 0.1% by mass of a surfactant was blended as a dispersant and 0.1% by mass of a hydrophobic silica type mineral oil-based defoaming agent was blended as a defoaming agent.

Second Coating Layer

As the polyvinylidene chloride latex of the second coating layer, Saran Latex L-549B manufactured by Asahi Kasei Corporation was used without dilution.

Examples 1 to 5 and Comparative Examples 1 and 2

After the surface of the above substrate was previously subjected to corona discharge treatment, the first coating layer coating liquid prepared as described above was applied by a microgravure method so as to have a predetermined film thickness listed in Table 1 and the applied coating liquid was dried at 110° C. to form the first coating layer. Subsequently, the laminated structure was prepared by applying the polyvinylidene chloride latex onto the surface of the first coating layer by a microgravure method so as to have a predetermined film thickness listed in Table 1 and drying the applied coating liquid at 100° C. to form the second coating layer. With respect to each of the obtained laminated structures, the adhesiveness, gas barrier property, water resistance, and oil resistance were evaluated. The obtained results are listed in Table 1.

TABLE 1

| | First coating layer | Second coating layer | Adhesiveness | Gas barrier property | Water resistance | Oil resistance |
|---|---|---|---|---|---|---|
| Example 1 | 5 μm | 1 μm | ○ | ○ | ○ | ○ |
| Example 2 | 1 μm | 5 μm | ○ | ○ | ○ | ○ |
| Example 3 | 5 μm | 5 μm | ○ | ○ | ○ | ○ |
| Example 4 | 10 μm | 5 μm | ○ | ○ | ○ | ○ |
| Example 5 | 5 μm | 10 μm | ○ | ○ | ○ | ○ |
| Comparative Example 1 | — | 5 μm | x | ○ | ○ | ○ |
| Comparative Example 2 | 5 μm | — | ○ | x | Δ | Δ |

As is clear from the results listed in Table 1, Examples 1 to 5 according to the present invention had excellent adhesiveness between the substrate and the coating layer, and also had excellent properties of the gas barrier property, the water resistance, and the oil resistance.

Example 6 and Comparative Example 3 and 4

In order to evaluate the elution of calcium carbonate from the sheet, a sample that was the above substrate as it was (Comparative Example 3), a sample in which the first coating layer (thickness 5 μm) alone was formed on the substrate (Comparative Example 4), and a sample in which the first coating layer (thickness 5 μm) and the second coating layer (thickness 5 μm) each were formed on the substrate (Example 6) were prepared. As the methods of forming the first coating layer and the second coating layer, the microgravure method was performed in the same manner as the manner in Examples 1 to 5. These samples were used for examining the elution property by subjecting the samples to immersion treatment and thus the first coating layer and the second coating layer of Example 6 and the first coating layer of Comparative Example 4 each were formed on both surfaces of the substrate.

The calcium carbonate elution property was evaluated with respect to Example 6 and Comparative Examples 3 and 4. The obtained results are listed in Table 2. Each mass change rate listed in Table 2 lists the average value of the values obtained from 10 samples.

TABLE 2

| | Mass change rate after a lapse of 30 minutes | Mass change rate after a lapse of 24 hours |
|---|---|---|
| Comparative Example 3 | 3.8% increase | 12.5% increase |
| Comparative Example 4 | 1.8% increase | 8.4% increase |
| Example 6 | No change | No change |

As listed in Table 2, it was found that the sample in Example 6 according to the present invention did not change in mass even after being immersed in an acetic acid aqueous solution for a long time and thus that the elution of calcium carbonate included in the substrate did not occur.

REFERENCE SIGNS LIST

1 Substrate
2 First coating layer
3 Second coating layer

The invention claimed is:

1. A laminated structure comprising:
   a second coating layer comprising a polyvinylidene chloride-based resin through a first coating layer formed by blending clay in a proportion of 35% by mass or more and 65% by mass or less and light calcium carbonate in a proportion of 5% by mass or more and 30% by mass or less in a continuous phase made of an acrylic polymer on one surface or both surfaces of a substrate comprising a thermoplastic resin and an inorganic substance powder in a mass ratio of 50:50 to 10:90.

2. The laminated structure according to claim 1, wherein the polyvinylidene chloride-based resin is a polyvinylidene chloride resin latex.

3. The laminated structure according to claim 1, wherein the thermoplastic resin is a polyolefin-based resin.

4. The laminated structure according to claim 1, wherein the inorganic substance powder is a calcium carbonate powder.

5. The laminated structure according to claim 1, wherein a volume average particle diameter of the clay is 1.0 μm or more and 10.0 μm or less.

6. The laminated structure according to claim 1, wherein a volume average particle diameter of the light calcium carbonate is 0.05 μm or more and 2.00 μm or less.

7. The laminated structure according to claim 1, wherein the acrylic polymer is of an alkyl (meth)acrylate.

8. The laminated structure according to claim 7, wherein the alkyl (meth)acrylate is a kind or two or more kinds of alkyl (meth)acrylates selected from the group consisting of methyl acrylate, ethyl acrylate, n-propyl acrylate, isopropyl acrylate, n-butyl acrylate, isobutyl acrylate, n-octyl acrylate, 2-ethylhexyl acrylate, isooctyl acrylate, nonyl acrylate, methyl methacrylate, ethyl methacrylate, n-propyl methacrylate, isopropyl methacrylate, n-butyl methacrylate, isobutyl methacrylate, n-octyl methacrylate, 2-ethylhexyl methacrylate, isooctyl methacrylate, 2-hydroxymethyl acrylate, 2-hydroxyethyl methacrylate, 2-hydroxypropyl acrylate, and 2-hydroxypropyl methacrylate.

9. The laminated structure according to claim 2, wherein the thermoplastic resin is a polyolefin-based resin.

10. The laminated structure according to claim 2, wherein the inorganic substance powder is a calcium carbonate powder.

11. The laminated structure according to claim 3, wherein the inorganic substance powder is a calcium carbonate powder.

12. The laminated structure according to claim 9, wherein the inorganic substance powder is a calcium carbonate powder.

13. The laminated structure according to claim 2, wherein the acrylic polymer is of an alkyl (meth)acrylate.

14. The laminated structure according to claim 3, wherein the acrylic polymer is of an alkyl (meth)acrylate.

15. The laminated structure according to claim 4, wherein the acrylic polymer is of an alkyl (meth)acrylate.

16. The laminated structure according to claim 9, wherein the acrylic polymer is of an alkyl (meth)acrylate.

17. A container product comprising the laminated structure as claimed in claim 1.

18. The container product according to claim 17, wherein the container product is used as a food packaging container.

19. A method for producing a laminated structure, the method comprising:
applying an acrylic polymer aqueous emulsion containing clay in a proportion of 35% by mass or more and 65% by mass or less and light calcium carbonate in a proportion of 5% by mass or more and 30% by mass or less in a dried mass in a continuous phase of an acrylic polymer on one surface or both surfaces of a substrate including a thermoplastic resin and an inorganic substance powder in a mass ratio of 50:50 to 10:90, and thereafter applying a polyvinylidene chloride resin latex.

20. The method for producing the laminated structure according to claim 19, wherein the substrate comprising the thermoplastic resin and the inorganic substance powder in a mass ratio of 50:50 to 10:90 is extruded and formed in a form of a sheet, the acrylic polymer aqueous emulsion containing the clay in a proportion of 35% by mass or more and 65% by mass or less and the light calcium carbonate in a proportion of 5% by mass or more and 30% by mass or less in a dried mass in the continuous phase of the acrylic polymer is applied to one surface or both surfaces of the obtained sheet of the substrate, and thereafter the polyvinylidene chloride resin latex is applied.

* * * * *